(12) United States Patent
Bauchot et al.

(10) Patent No.: US 7,966,377 B2
(45) Date of Patent: Jun. 21, 2011

(54) DELIVERING AND REPLYING TO EMAIL USING HIDDEN ADDRESS

(75) Inventors: Frederic J. Bauchot, Saint-Jeannet (FR); Francois-Xavier Drouet, La Gaude (FR); Gerard Marmigere, Drap (FR); Olivier Rousseau, Vence (FR)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 12/365,521

(22) Filed: Feb. 4, 2009

(65) Prior Publication Data

US 2010/0057866 A1    Mar. 4, 2010

(51) Int. Cl.
G06F 15/16    (2006.01)
(52) U.S. Cl. ........ 709/206; 709/201; 709/203; 709/207; 709/218; 709/245
(58) Field of Classification Search .................. 709/206, 709/201, 245, 203, 207, 218
See application file for complete search history.

(56) References Cited

U.S. PATENT DOCUMENTS

| 7,054,906 | B2 | 5/2006 | Levosky | |
|---|---|---|---|---|
| 7,216,227 | B2 | 5/2007 | Grynberg | |
| 7,231,427 | B1 * | 6/2007 | Du | 709/206 |
| 7,237,010 | B2 | 6/2007 | Mora | |
| 2005/0210107 | A1 * | 9/2005 | Mora | 709/206 |

OTHER PUBLICATIONS

T. Abe et al.; "Spam Filtering with Cryptographic Ad-Hoc E-Mail Addresses"; Applications and the Internet Workshops, 2005, Saint Workshops 2005, The 2005 Symposium; Issue 31-04, Jan. 2005, pp. 114-117, published May 8, 2006.
http://pascal.vanhecke.info/2007/10/09/master-of-your-mailbox-an-email-alias-for-every-site-you-leave-your-address; "Master of Your Mailbox: An Email Alias for Every Site You Leave Your Address"; Dec. 17, 2008; pp. 1-7.

* cited by examiner

*Primary Examiner* — Wing F Chan
*Assistant Examiner* — Benjamin M Thieu
(74) *Attorney, Agent, or Firm* — Cantor Colburn LLP; Jean Sullivan

(57) ABSTRACT

A method for use when an original email is sent from an originator to a receiver, having a real email address, at a destination email address, which includes a concatenation of an alias and a magic number, is provided and includes replacing the destination email address with the real email address of the receiver, adding a new header field to the original email indicating that the destination email address was an original destination of the original email and forwarding the original email to the receiver at the real email address. If the receiver replies with a reply email, the method further includes setting a from header field in the reply email with a new header field indicating that the destination email address was an original destination of the original email, and if the original email is appended, removing the new header field from the original email.

1 Claim, 5 Drawing Sheets

---

Mail sent

```
To:consumer1.YTc2ZDhjYzM2YmRjMjQ4YmFhYmNhZmJkZDQyMThjY2Y@gmail.com
From: ServiceClient@rueducommerce.com
Subject:Presentation of new Nikon D300
Msg_Id:xxxxx
```

Mail delivered

```
To:consumer1@fr.ibm.com
From: ServiceClient@rueducommerce.com
Subject:Presentation of new Nikon D300
Original_addr:consumer1.YTc2ZDhjYzM2YmRjMjQ4YmFhYmNhZmJkZDQyMThjY2Y@gmail.com
Messageg_ID:xxxxx
```

Mail reply

```
To: ServiceClient@rueducommerce.com
From: consumer1.YTc2ZDhjYzM2YmRjMjQ4YmFhYmNhZmJkZDQyMThjY2Y@gmail.com
Subject:Re:Presentation of new Nikon D300
In_Reply_To:xxxxx
```

Mail sent

To:consumer1.YTc2ZDhjYzM2YmRjMjQ4YmFhYmNhZmJkZDQyMThjY2Y@gmail.com
From: ServiceClient@rueducommerce.com
Subject:Presentation of new Nikon D300
Msg_Id:xxxxx Mail delivered To:consumer1@fr.ibm.com
From: ServiceClient@rueducommerce.com
Subject:Presentation of new Nikon D300
Original_addr:consumer1.YTc2ZDhjYzM2YmRjMjQ4YmFhYmNhZmJkZDQyMThjY2Y@gmail.com
Messageg_ID:xxxxx Mail reply To: ServiceClient@rueducommerce.com
From: consumer1.YTc2ZDhjYzM2YmRjMjQ4YmFhYmNhZmJkZDQyMThjY2Y@gmail.com
Subject:Re:Presentation of new Nikon D300
In_Reply_To:xxxxx

FIG. 3

DELIVERING AND REPLYING TO EMAIL USING HIDDEN ADDRESS

CROSS REFERENCE TO RELATED APPLICATIONS

This application claims the benefits of Application No. EP08305522, filed in the European Patent Office on Sep. 4, 2008, which is fully incorporated herein by reference.

BACKGROUND

Aspects of the present invention are directed to an email system and method and, more particularly, to a system and method to deliver and reply to mail using a hidden address.

Typically, when a consumer wants to purchase something via a website, download documentation or a shareware program or simply receive support services, the consumer is prompted to enter his own personal email address. Thereafter, the consumer generally has no further control of the usage of the email address he has submitted.

As is well known, at this point, lists of email addresses, including the customer's submitted email address, which are compiled by the proprietor of the website, may be re-used by the proprietor itself or re-sold to other companies for their use. As a result, the customer's email address becomes known to a large number of other companies who proceed to use the email address for marketing or other purposes. Thus, the customer is undesirably bombarded with a potentially large amount of unwanted email.

SUMMARY

In accordance with an aspect of the invention, a method for use when an original email is sent from an originator to a receiver, having a real email address, at a destination email address, which includes a concatenation of an alias and a magic number calculated with respect to an email address of the originator and the real email address, is provided and includes parsing the alias and the magic number from within the destination email address to determine whether the alias exists, forwarding an error message to the originator if the alias does not exist and determining whether the destination email address is allowed to be used by the originator, and forwarding an error message to the originator if the destination email address is not allowed to be used by the originator and, if the destination email address is allowed to be used by the originator, replacing the destination email address with the real email address of the receiver, adding a new header field to the original email indicating that the destination email address was an original destination of the original email and forwarding the original email to the receiver at the real email address.

If the receiver replies to the original email with a reply email, the method further includes setting a from header field in the reply email with a value of the new header field indicating that the destination email address was an original destination of the original email, and, if the original email is appended, removing the new header field from the original email.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 3 is a flow diagram illustrating an exemplary response method;

DETAILED DESCRIPTION

Figure 1:
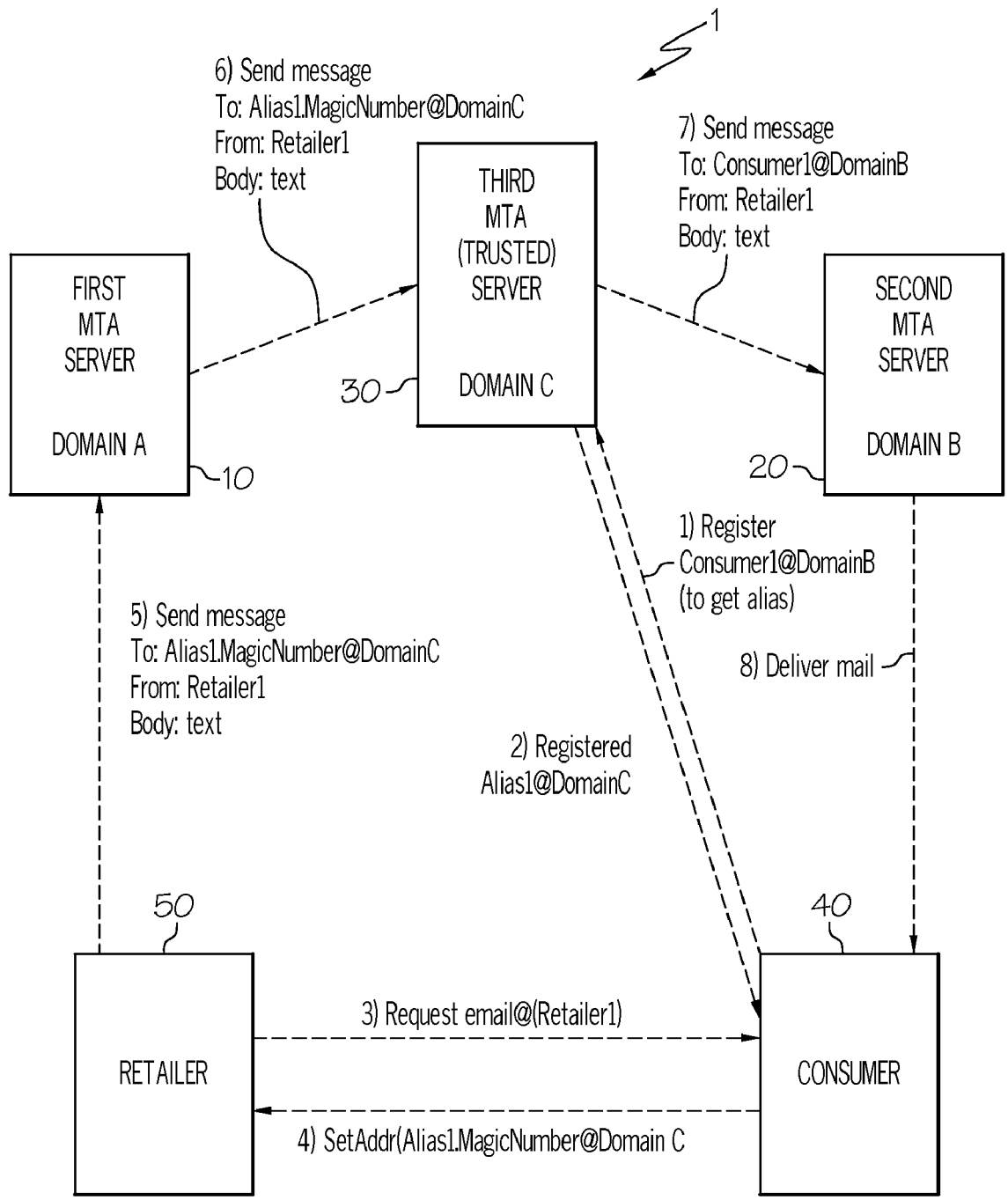
FIG. 1 is a schematic diagram of an exemplary system in accordance with embodiment of the present invention.

With reference to FIG. 1, a system 1 in which an originator, such as a retailer 50, is associated with a website to be accessed by a receiver, such as a consumer 40, is shown. The system 1 includes a first mail transfer agent (MTA) server 10. The first MTA server 10 is operationally disposed in a first domain A and is configured to provide the retailer 50 with a retailer email address associated with the first domain A. The system 1 further includes a second MTA server 20. The second MTA server 20 is operationally disposed in a second domain B and is configured to provide the consumer 40 with a real email address associated with the second domain B.

A third MTA (trusted) server 30 is operationally disposed in a third domain C. The third MTA server 30 receives a registration email from the consumer 40 during a consumer registration operation with the website of the retailer 50. The third MTA server 30 responds to the registration email of the consumer 40 with a confirmation email indicating an alias of the consumer 40.

The consumer 40, when prompted by the retailer 50 to provide his own email address, calculates a magic number on his own or by way of his client device and creates a new email address for his/her own use with the website of the retailer 50. The new email address is associated with the third domain C and includes a concatenation of the alias and the magic number and will be hereinafter referred to as a single user useable email address.

Figure 2:
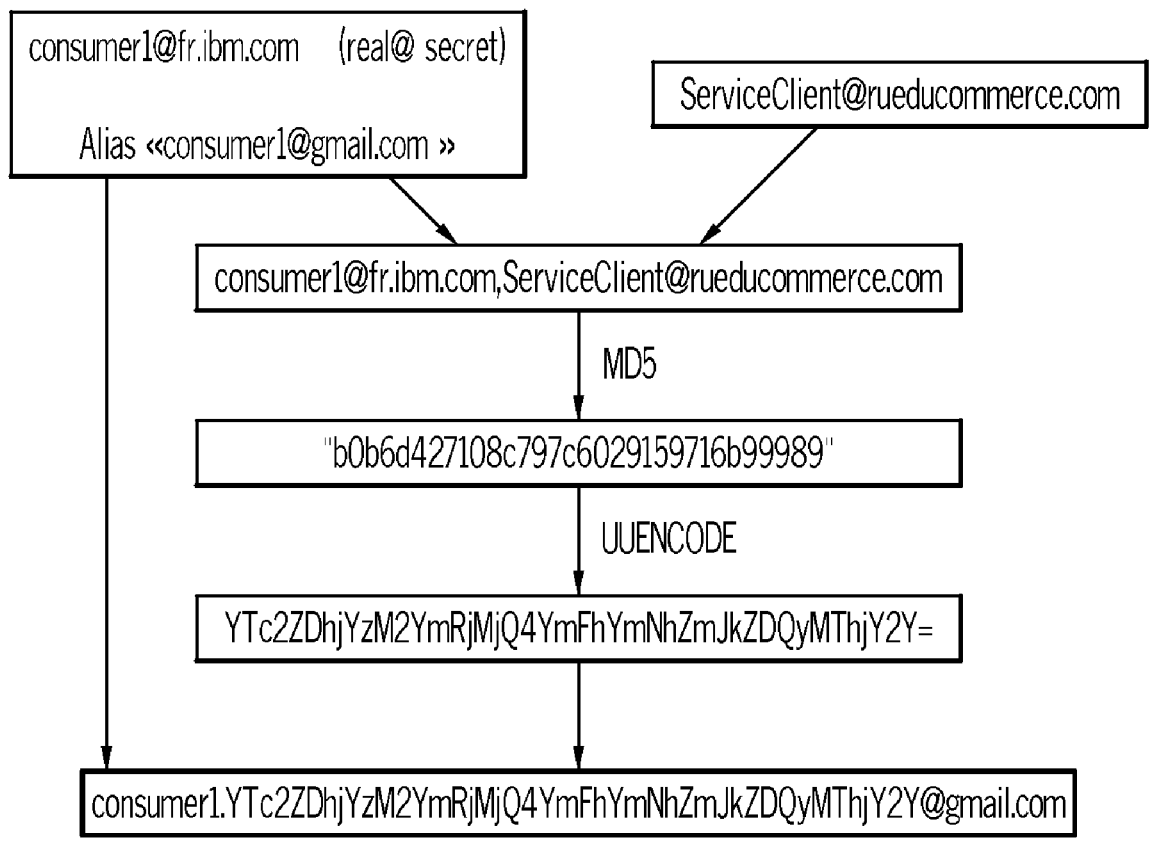
FIG. 2 is a flow diagram illustrating an exemplary email address creation method.

With reference to FIG. 2, the single user useable email address is built using the alias of the consumer 40 and a hashing of the retailer 50 email address and the real address of the consumer 40. In an embodiment of the invention, a hashing operation proceeds by a combination of the two email addresses and an encoding of the said combination via, e.g., MD5 and UUENCODE. Of course, it is understood that other methods of encoding are available and that the methods shown in FIG. 2 are merely exemplary.

As shown in FIGS. 1-3, when the consumer 40 responds to the email request with a response to set his email as the single user useable email address, the retailer 50 communicates with the consumer 40 via a subsequent email addressed to the single user useable email address. The subsequent email is routed, via the first MTA server 10, to the third MTA server 30. Here, the subsequent email is re-addressed to the real address of the consumer 40 and a new parameter "origin_addr", which indicates that the address (in this case, the single user useable email address) has been used as the new email address, is added in the mail header. Then the subsequent email is routed to the consumer 40 via the second MTA server 20.

In any further replies and/or responses by the consumer 40 to the retailer, the originator of the reply (e.g., the "From:" header field) is replaced by the email address specified by the new parameter "origin_addr" found in the received email header and said parameter is removed from the received email if the received email is appended to the reply.

Figure 4:
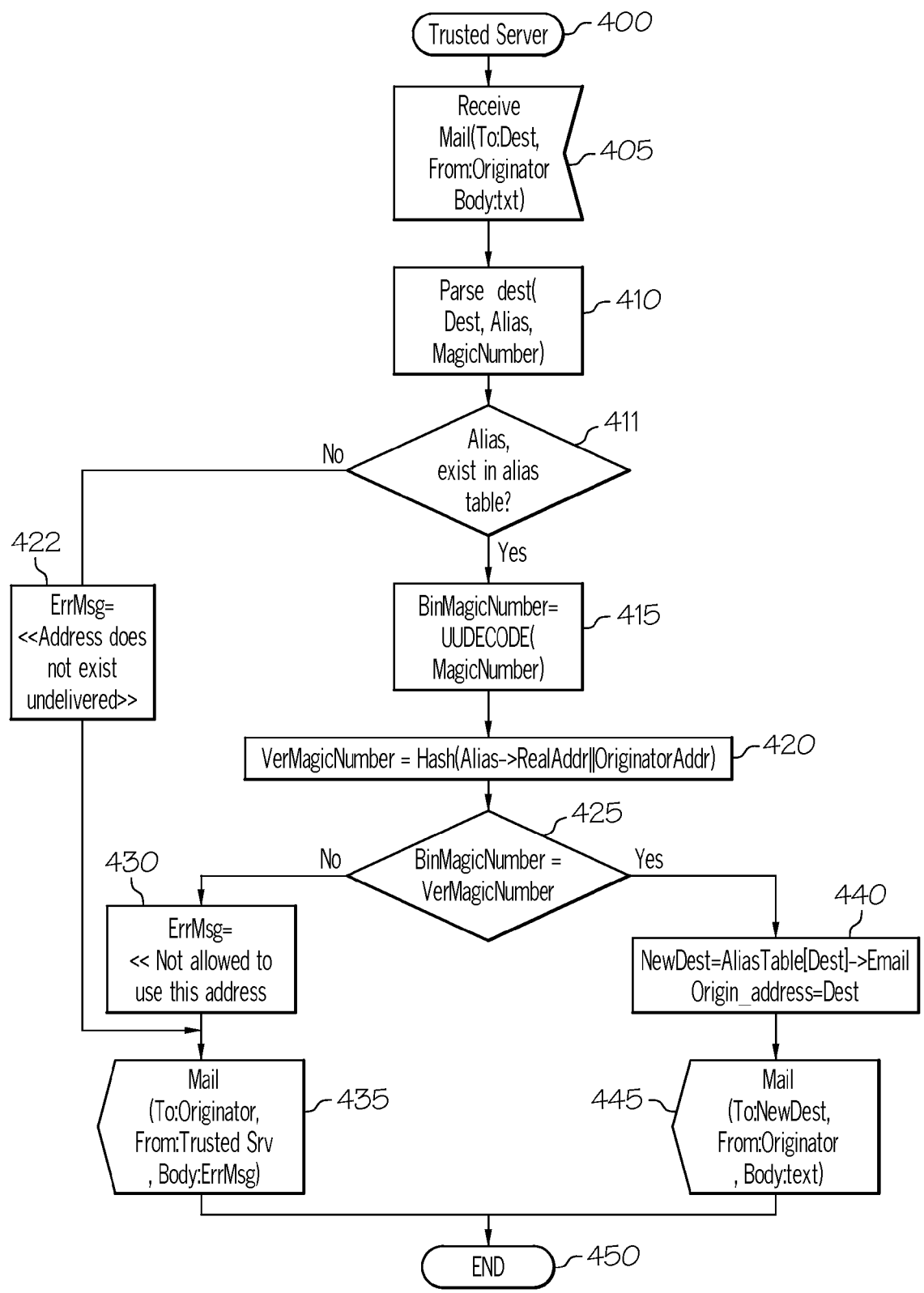
FIG. 4 is a flow diagram that depicts an exemplary behaviour of a trusted mail transfer agent.

With reference to FIG. 4, the third MTA server 30 may be operated according to the method illustrated by the flow diagram. At operations 400 and 405, the third MTA server 30 receives an email with a destination address specified in its "To:" header field, which is composed from an alias that is concatenated to a magic number calculated by, e.g., a user or the user's client. At operation 410, the destination address is parsed to obtain the alias and the magic number and, in operation 411, the alias is checked against an alias table. If the alias is found in the alias table, operation 415 proceeds. Otherwise, an error message "Address does not exist, undelivered message" is generated in operation 422 and is sent as a response to the mail originator in operation 435.

In operation 415, the magic number is transformed using a well known function like UUDECODE. Then, a verification magic number is calculated (operation 420) by hashing a real destination address corresponding to the alias concatenated to the original address of the message (e.g., the email address originally in the "From:" header field of the email). Both the real destination address and the alias are retrieved from the alias table.

If the verification magic number and the magic number retrieved from the email are determined to be equal (operation 425), the method proceeds to operation 440. Otherwise, an error message "not allowed to use this address" is generated (operation 430) and sent as a reply (operation 435). Thereafter, the method is ended (operation 450). At operation 440, the destination email address of the original email (e.g., the email address found in the To: line of the original email) is replaced by the user's real email address as it is found in the alias table and a new header field is added (Origin addr). The new header field specifies that the single party usable email address has been used as the original address. Then, the email is propagated to its destination and delivered to the user (operation 445) with the user being, thereby, made aware that the single party usable email address was originally used. Thereafter, the method is ended (operation 450).

Figure 5:
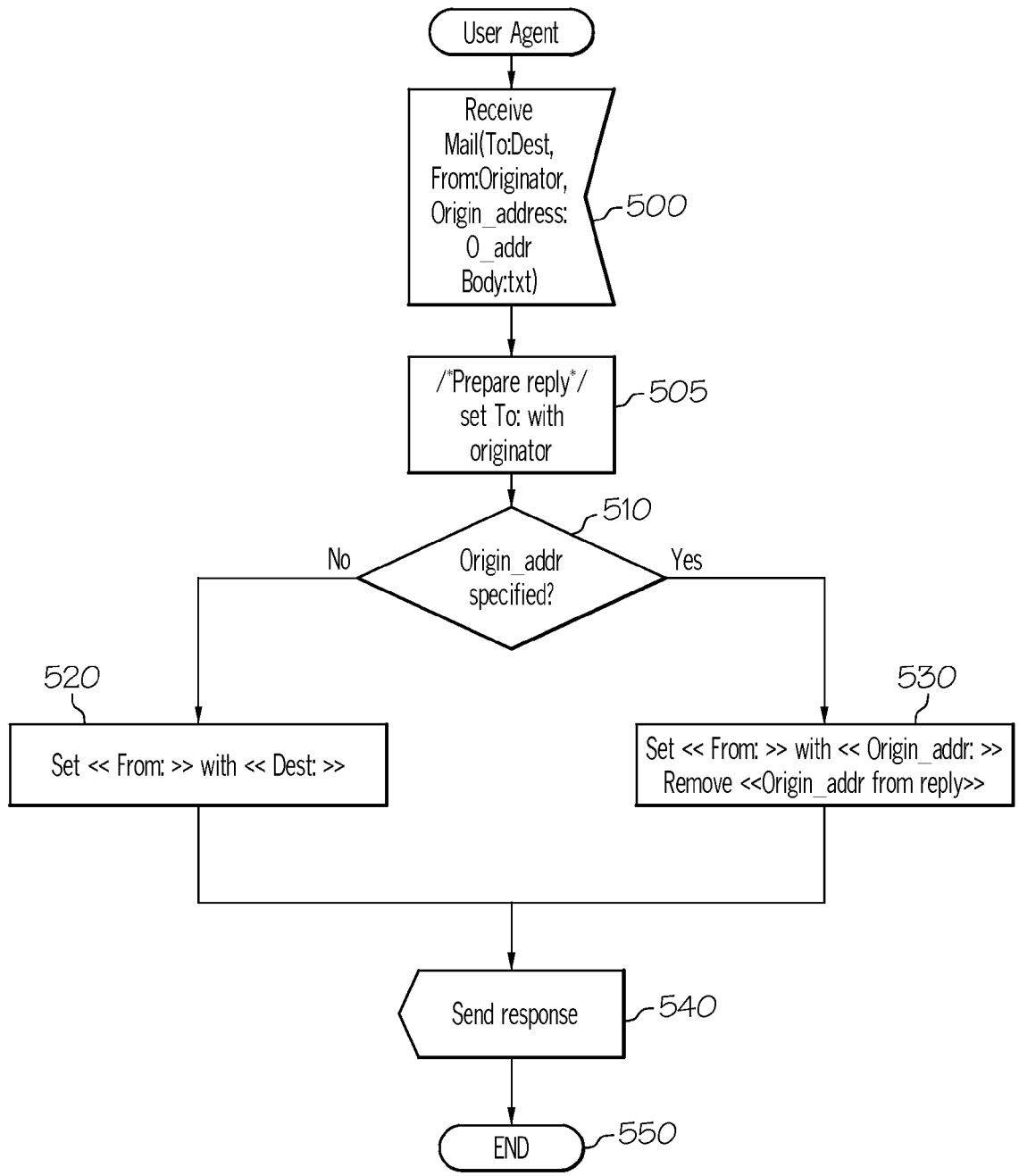
FIG. 5 is a flow diagram that illustrates an exemplary behavior of a client application sending a reply.

With reference to FIG. 5, a client application of, e.g., the consumer 40 may be operated according to the method illustrated by the flow diagram. In accordance with the method, the user agent (i.e., the client application of the consumer 40) receives an email from "originator" (operation 500) and prepares a reply to the "originator" (operation 505). Then, a determination is made as to whether an original address, such as the single party user useable email address of the user, is specified (operation 510) in a mail header field. If an original address is specified, the reply is set with the single party user useable email address as the originator of the reply (e.g., the "From:" header field in the reply refers to the single party user useable email address) and the "origin_addr" is removed from the received email if the received email is appended to the reply (operation 530). If, on the other hand, an original address is not specified, the reply originator (e.g., the "From:" line in the reply) is set with the destination address (e.g., the "To:" line) of the received mail the reply responds to. Then, the reply is sent (operation 540) and the method ended (operation 550).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method for use when an original email with a message identification provided in a message identification line is sent from an originator to a receiver, having a real email address, at a destination email address, which includes a concatenation of an alias and a magic number calculated with respect to an email address of the originator and the real email address, the method comprising:

parsing the alias and the magic number from within the destination email address to determine whether the alias exists;

forwarding an error message to the originator if the alias does not exist and determining whether the destination email address is allowed to be used by the originator; and forwarding an error message to the originator if the destination email address is not allowed to be used by the originator and, if the destination email address is allowed to be used by the originator:

replacing the destination email address with the real email address of the receiver, adding a new header field having the destination email address provided as a value therein to the original email below a subject line and above a message identification line having the message identification provided therein to indicate that the destination email address was an original destination of the original email, and forwarding the original email to the receiver at the real email address, wherein if the receiver replies to the original email with a reply email, the method further includes:

setting a from header field in the reply email with the value of the destination email address of the new header field to indicate that the destination email address was an original destination of the original email, adding a second new header field below a subject line indicating that the reply email is in reply to the message identification provided in the message identification line of the original email, and removing the new header field.

* * * * *